US010692094B2

(12) United States Patent
Batiste

(10) Patent No.: US 10,692,094 B2
(45) Date of Patent: *Jun. 23, 2020

(54) SYSTEMS AND METHODS FOR DETERMINING CROWD SENTIMENT BASED ON UNSTRUCTURED DATA

(71) Applicant: Steven Batiste, Woodland Hills, CA (US)

(72) Inventor: Steven Batiste, Woodland Hills, CA (US)

(73) Assignee: Steven Batiste, Woodland Hills, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/829,756

(22) Filed: Dec. 1, 2017

(65) Prior Publication Data

US 2018/0157742 A1    Jun. 7, 2018

Related U.S. Application Data

(63) Continuation of application No. 14/587,790, filed on Dec. 31, 2014, now Pat. No. 9,836,531.

(51) Int. Cl.
*G06F 16/00* (2019.01)
*G06Q 30/02* (2012.01)
*G06F 16/35* (2019.01)
*G06Q 10/00* (2012.01)

(52) U.S. Cl.
CPC .......... *G06Q 30/02* (2013.01); *G06F 16/353* (2019.01); *G06Q 10/00* (2013.01)

(58) Field of Classification Search
None
See application file for complete search history.

(56) References Cited

U.S. PATENT DOCUMENTS

| 7,996,440 | B2 * | 8/2011 | Probst | G06F 17/2745 |
| | | | | 704/275 |
| 8,185,530 | B2 * | 5/2012 | Zhao | G06F 16/353 |
| | | | | 707/737 |
| 8,626,801 | B2 * | 1/2014 | Probst | G06F 17/2745 |
| | | | | 707/803 |
| 8,639,683 | B2 * | 1/2014 | Gil | G06F 16/951 |
| | | | | 707/711 |
| 8,799,252 | B2 * | 8/2014 | Yoon | H04N 21/25891 |
| | | | | 707/706 |
| 9,626,369 | B2 * | 4/2017 | Yoon | H04N 21/25891 |
| 2003/0074350 | A1 * | 4/2003 | Tsuda | G06F 16/9535 |

(Continued)

*Primary Examiner* — Debbie M Le
(74) *Attorney, Agent, or Firm* — Cotman IP Law Group, APLC

(57) ABSTRACT

A systems and methods for determining crowd sentiment based on unstructured data are presented. The system includes scrapers that continuously scour a computer network to obtain one or more published documents and stores the documents in a document repository. The system further processes each of the documents through a filter (or percolator) to extract one or more system keywords, links and statistical information such as number of occurrences of the system keyword, rate of change and direction of change for each system keyword and crowd sentiment for the system keyword. The system further includes a keyword cache system for maintaining the system keywords so that up to date crowd sentiment is available upon demand.

20 Claims, 13 Drawing Sheets

(56) References Cited

U.S. PATENT DOCUMENTS

| 2012/0036100 | A1* | 2/2012 | Probst | G06F 17/27 |
| | | | | 706/48 |
| 2016/0124930 | A1* | 5/2016 | Dhawan | G06F 17/243 |
| | | | | 715/224 |

* cited by examiner

SYSTEMS AND METHODS FOR DETERMINING CROWD SENTIMENT BASED ON UNSTRUCTURED DATA

CROSS-REFERENCE TO RELATED APPLICATIONS

The present application is a continuation of U.S. application Ser. No. 14/587,790, filed on Dec. 31, 2014, the specification of which is herein incorporated by reference for completeness of disclosure.

BACKGROUND OF THE INVENTION

Field of the Invention

Embodiments of the invention relates to the field of data mining. More specifically, the invention relates to systems and methods for determining crowd sentiment based on unstructured data.

Description of the Related Art

Current systems use user interactions with search engines and other user online activities to determine crowd sentiment.

BRIEF SUMMARY OF THE INVENTION

One or more embodiments of the invention are directed to systems and methods for determining crowd sentiment based on unstructured data. In one embodiment, the system comprises on or more scrapers that continuously scour a computer network, such as the internet, to obtain one or more published documents and store the documents in a document repository. The system further processes each of the documents through a filter (or percolator) to extract one or more system keywords, links and statistical information such as number of occurrences of the system keyword, rate of change and direction of change for each system keyword and crowd sentiment for the system keyword. The system further includes a keyword cache system for maintaining the system keywords so that up-to-date crowd sentiment is available upon demand.

In one or more embodiments of the system of the present invention, one or more Scrapers connected to a computer network (or network fabric), e.g. Internet, scours the network for documents. The scrapers identify and download published documents. Types of documents may include news articles, blogs, reports (e.g. technology, food, sports, etc.), and any other type of electronic document that may contain useful information about consumer sentiments about a particular issue, person, thing, etc.

In one or more embodiments, the scrapers preferably continuously or periodically scrape the network for documents. As new documents are found, they are stored in a document repository.

In one or more embodiments, the document repository is accessible by one or more Percolators (or Filters). A percolator classifies the documents, extracts system keywords from the documents, determines crowd sentiments and other statistical data from the documents, etc.

In one or more embodiments, the percolator uses natural language processing to evaluate each document in document repository and extract keywords; generate sentiment value for the document; generate sentiment value for each keyword; and classifies the document by country of origin and class. The extracted keywords are classified as either system keywords or non-system keywords.

In one or more embodiments, system keywords are those keywords that have achieved notoriety in the public discourse. Non-system keywords are constantly review by a plasticity module for promotion to system keyword status. Criteria for promotion may comprise momentum and direction of change of momentum, for instance.

In one or more embodiments, each document from the document repository is processed to extract words and identify keywords. The extracted words are further processed to extract phrases; perform sentiment analysis to determine crowd sentiment and used to determine classification of the document, e.g. food, sports, technology, politics, etc.

In one or more embodiments, outputs of percolator are stored in Relationship Data repository. Data in Relationship Data repository may include System Keywords, Keyword Links, Keyword stats, Keyword metadata, document sentiments, Keyword sentiments, document classes, document countries, etc.

In one or more embodiments of the present invention, data in Relationship Data repository is processed and maintained by a Keyword Cache System that is accessible via user interface.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising systems and methods for determining crowd sentiment based on unstructured data will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-13.

Figure 1:
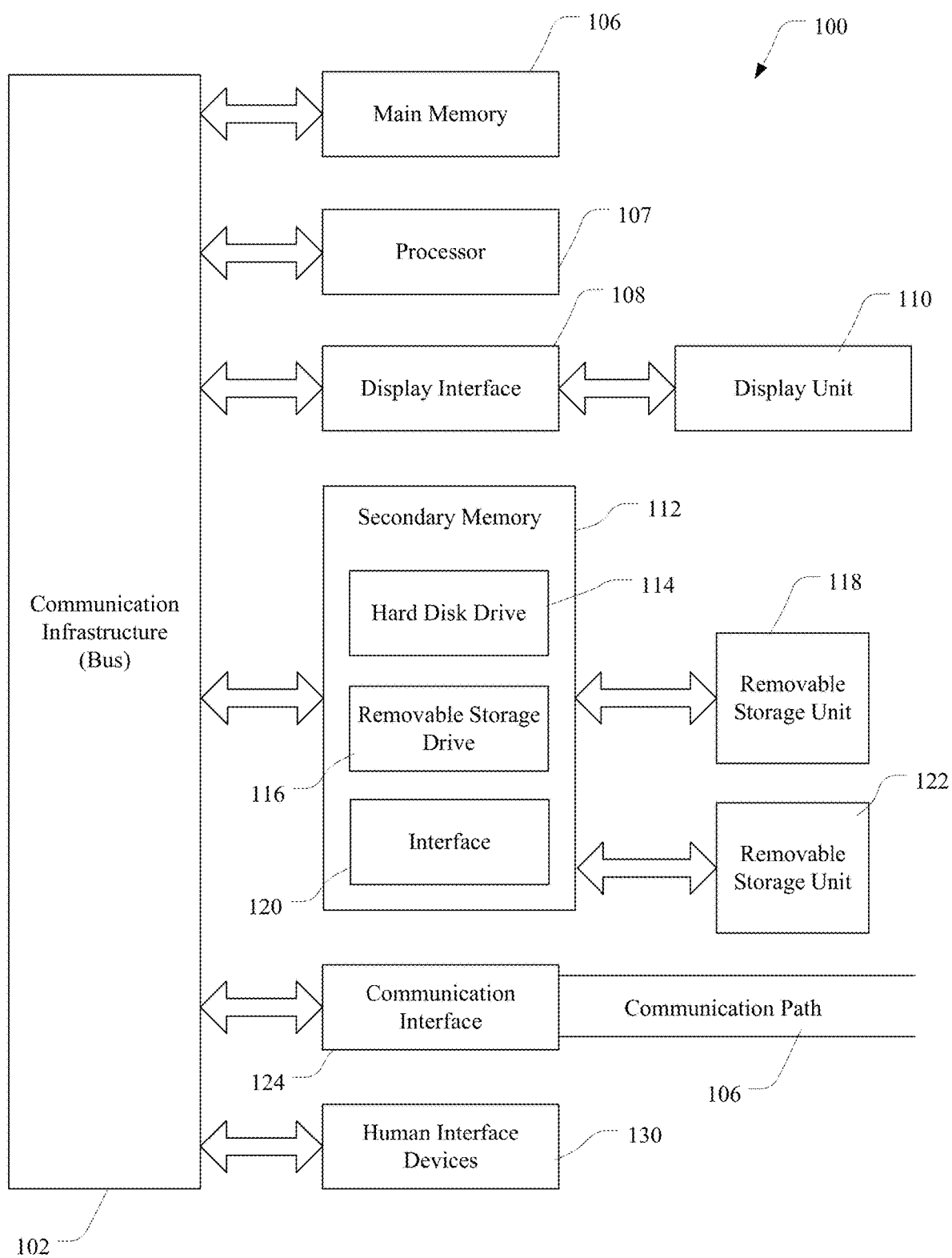
FIG. 1 illustrates a general-purpose computer and peripherals that when programmed as described herein may operate as a specially programmed computer capable of implementing one or more methods, apparatus and/or systems of the present invention.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

Figure 2:
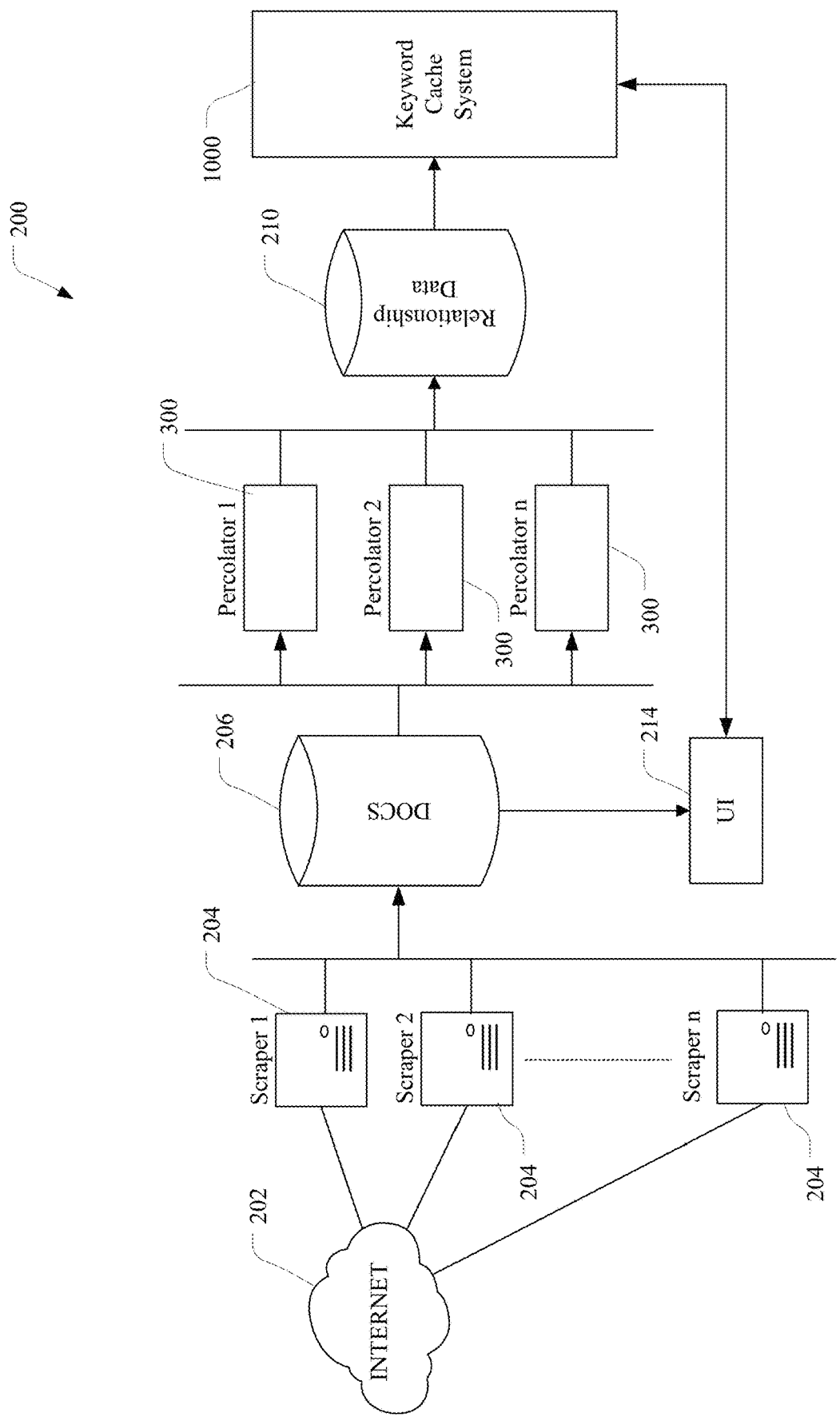
FIG. 2 is an illustration of a system for mining unstructured data in accordance with one or more embodiments of the present invention.

FIG. 2 is an illustration of a system for mining unstructured data in accordance with one or more embodiments of the present invention. As illustrated, one or more embodiments of system 200 of the present invention comprise one or more Scrapers 1 . . . n, e.g. 204, that scrape a computer network (or network fabric), e.g. Internet 202, for documents. The scrapers identify and download published documents. Types of documents may include news articles, blogs, reports (e.g. technology, food, sports, etc.), and any other type of electronic document that may contain useful information about consumer sentiments about a particular issue, person, thing, etc. Those of skill in the art would appreciate that Scraper 204 may be in the form of one or more separate computers on a network, e.g. computer 100, virtual machines on one or more computer systems/servers, software modules, etc.

System 200 preferably runs periodically scraping the Internet for documents, generating and processing keywords. As new documents are found by scraper 204, they are stored in document repository 206. Those of skill in the art would appreciate that Document repository 206 may be configured as a dedicated storage unit, a database server, disk array server, indexed database, or any type of non-transitory computer readable memory in a computer system. Document repository 206 is preferably accessible from a User Interface, e.g. UI 214, from which a user can review the types and contents of documents being acquired, manage the documents, and perform any other data management type function. UI 214 may be a dedicated client computer, for instance, or a computer terminal, e.g. Human Interface Device 130.

Data repository 206 is further accessible by one or more Percolators (e.g. Filters) 300. As illustrated and further described with respect to FIG. 3, percolator 300 classifies the documents, extracts keywords from the documents, determines crowd sentiments and other statistical data from the documents, etc. It should be apparent to those of skill in the art that Percolator 300 may be implemented in one or more separate computers on a network, e.g. computer 100, virtual machines on one or more computer systems/servers, software modules, etc.

Figure 3:
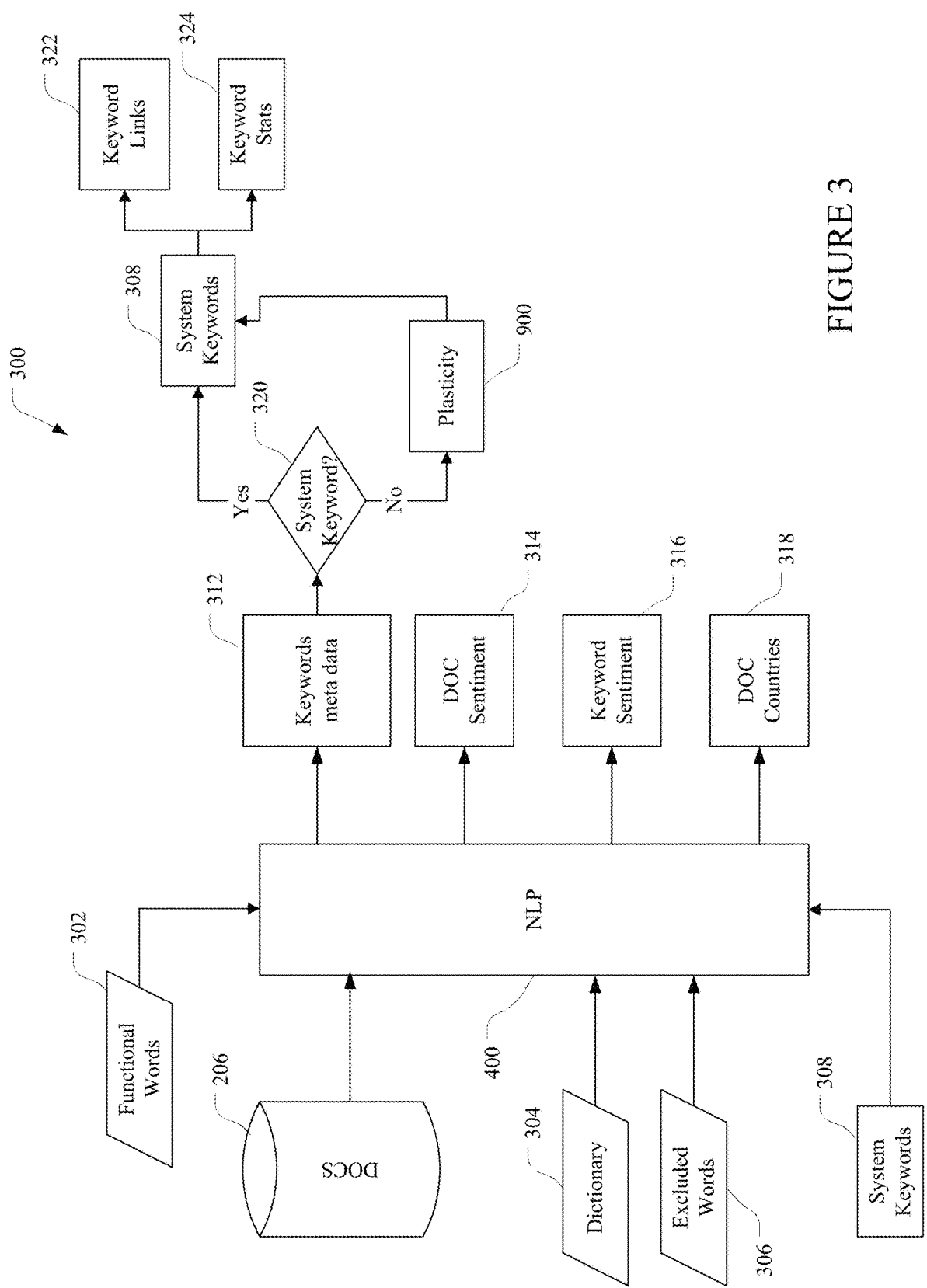
FIG. 3 is an illustration of a keyword percolator system in accordance with one or more embodiments of the present invention.

FIG. 3 is an illustration of a keyword percolator system 300 in accordance with one or more embodiments of the present invention. As illustrated, percolator 300 comprises NLP module 400. In one or more embodiments, NLP 400 employs natural language processing to evaluate each document in document repository 206 and extract keywords, e.g. Keywords meta data 312; generate sentiment value for the document, e.g. DOC Sentiment 314; generate sentiment value for each keyword, e.g. Keyword Sentiment 316; and classify the document by class and by country of origin, e.g. DOC Countries 318. Inputs to NLP 400 may include a Functional Words matrix 302, Dictionary 304, Excluded Words matrix 306, and library of System Keywords 308.

Figure 4:
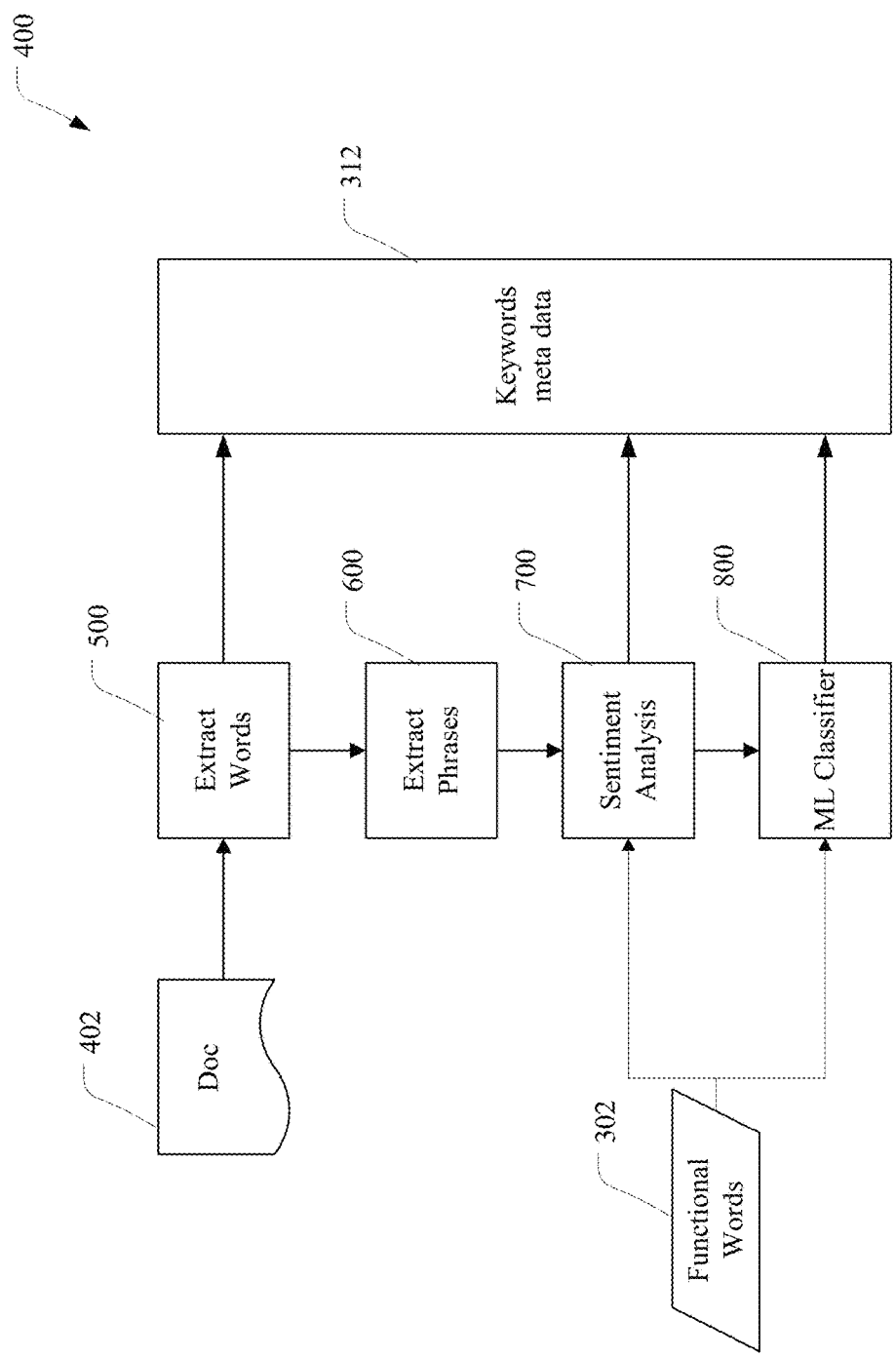
FIG. 4 is a flow diagram of the natural language processing module in accordance with one or more embodiments of the present invention.

FIG. 4 is a flow diagram illustrating the natural language processing module 400 in accordance with one or more embodiments of the present invention. As illustrated, each document 402, from document repository 206, is processed through Extract Words module 500 to extract words and identify keywords. The extracted keywords are used to update Keywords meta data 312. The extracted words are further processed through Extract Phrases module 600 to extract phrases. In one or more embodiments, NLP 400 performs a sentiment analysis to determine crowd sentiment, e.g. at Sentiment Analysis module 700, on the extracted words and phrases and then classifies the document by class using ML Classifier module 800. Outputs of the sentiment analysis 700 and ML Classifier 800 are also placed in Keywords meta data 312.

Figure 5:
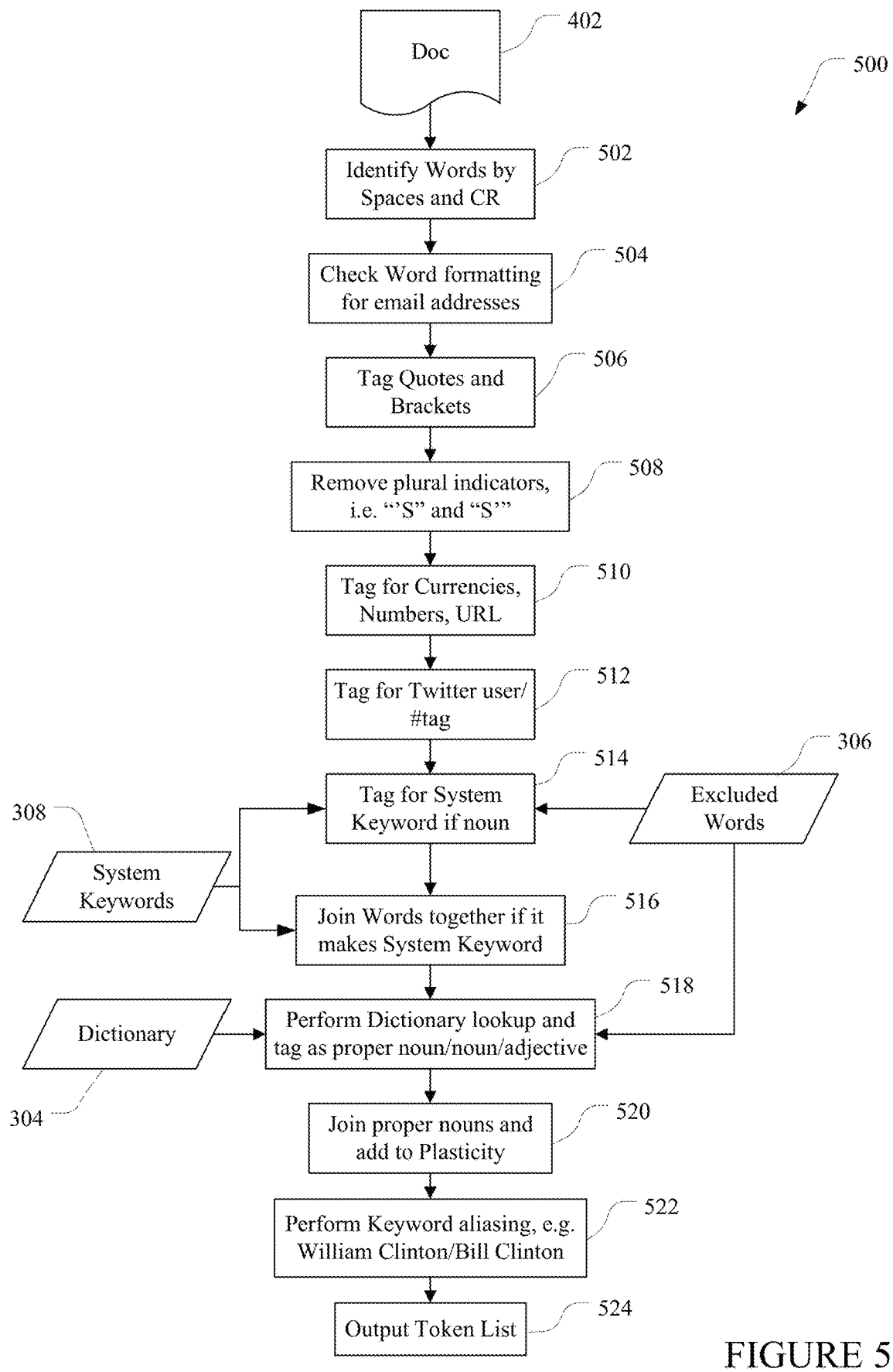
FIG. 5 is a flow diagram of the word extraction process in accordance with one or more embodiments of the present invention.

FIG. 5 is a flow diagram illustrating the Extract Words process 500 in accordance with one or more embodiments of the present invention. As illustrated, Extract Words module 500 analyzes each document 402 using spaces and carriage return (CR) to identify all the words in the document, e.g. block 502. Processing continues to block 504 where email addresses are identified and eliminated from the identified words list. At block 506, quotes and brackets are tagged in the identified words list. At block 508, plural indicators (e.g. "'s" and "s'") are removed from each word in the identified words list. At block 510, currencies, numbers and URLs (Uniform Resource Locator) are tagged. Processing continues at block 512 to tag Twitter users and #tags in the identified words list.

Processing continues to block 514. At block 514, each word in the identified words list is reviewed against the Excluded Words database 306 and any word in the Excluded Words database is removed from the identified words list. Excluded words may include profanity, for example. Each word in the remaining identified words list is then processed to see if it's a System Keyword by performing a lookup in System Keywords library 308. Each identified word in the list that is in the System Keywords library 308 is tagged as a System Keyword.

Processing continues to block 516 where words are joined together and tagged if the joining would result in one of the existing System Keywords. For instance, "William" and "Clinton" may be joined together because joining both words results in the existing System Keyword "William Clinton".

Processing continues to block 518. At block 518, a dictionary lookup is performed for each word in the identified words list so that each word is classified and tagged as a proper noun, a noun, or an adjective. In block 520, proper nouns are joined and added to the Keywords meta data 312 for further processing in the plasticity module 900.

Processing continues to block 522 where keyword aliasing is performed. For instance, if "William Clinton" and "Bill Clinton" refer to the same person, they are aliased and the resulting identified words list is output as a Token List at block 524.

Figure 6:
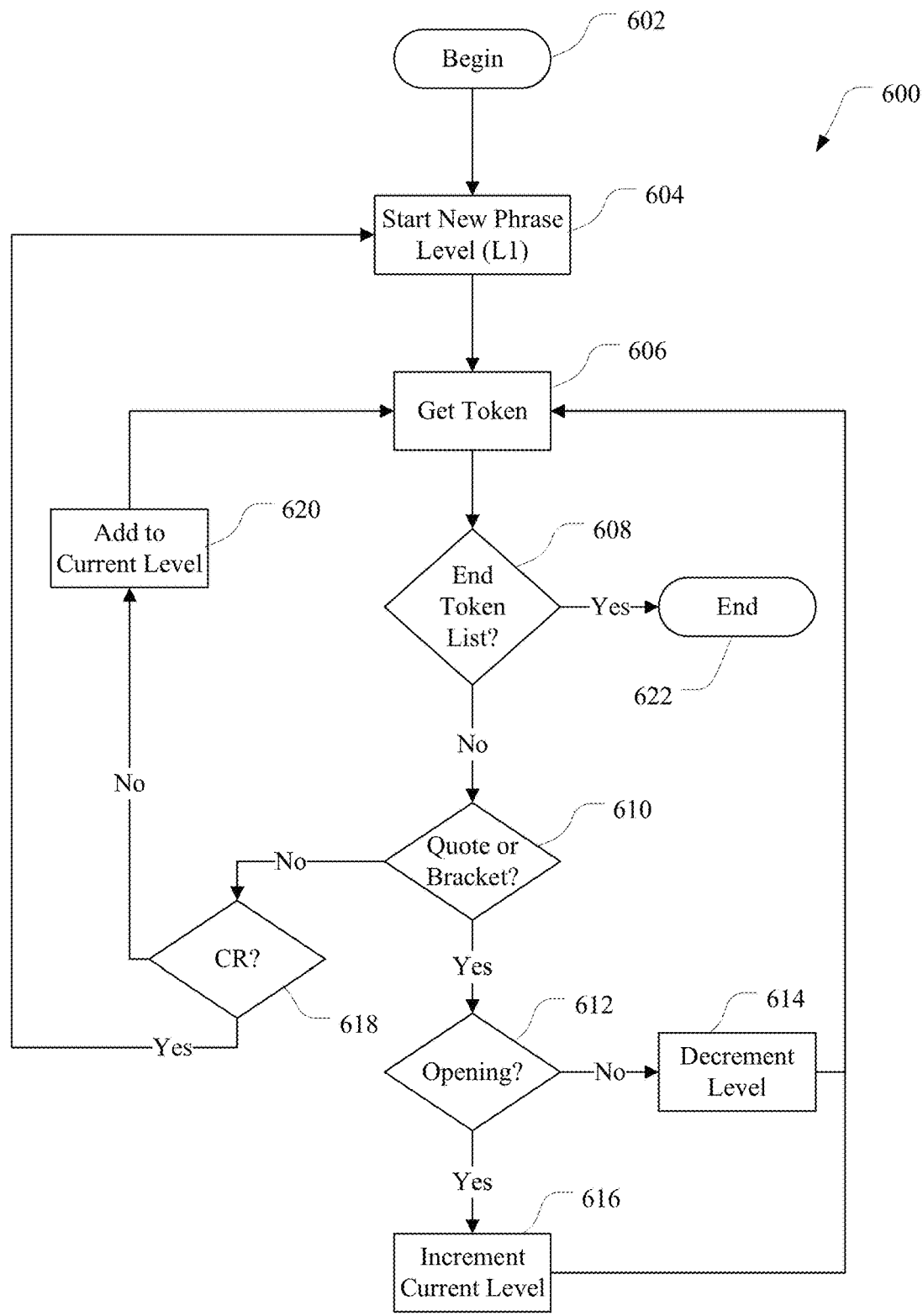
FIG. 6 is a flow diagram of the phrase extraction process in accordance with one or more embodiments of the present invention.

Referring back to FIG. 4, the Token List is forwarded to Extract Phrases 600 for further processing. FIG. 6 is a flow diagram illustrating the Extract Phrases process 600 in accordance with one or more embodiments of the present invention. As illustrated, phrase extraction begins at block 602. At block 604, a new Phrase Level, e.g. L1, is started. At block 606, the system gets a token (e.g. the first token) from the Token List. At block 608, the system checks if it's the end of the Token List, if it, phrase extraction processing 600 terminates at block 622. However, if at 608 it is determined not to be the end of the Token List, processing continues to block 610 to determine if the token is a Quote or a Bracket. If the token is not a quote or bracket, processing continues to block 618.

At block 618, a determination is made if the token is a carriage return (CR). If the token is not a CR, it is added to the Phrase Level at block 620 and processing returns to block 606 where the next token is retrieved from the Token List. If however, at block 618 a determination is made that the token is a CR, then processing returns to block 604 to start a new Phrase Level L1. A CR token would most likely indicate start of a new paragraph in the document.

Returning black to block 610, if a determination is made that the token is either a quote or a bracket, processing continues to block 612. At block 612 a determination is made whether the quote is an opening quote or whether the bracket is an opening bracket. If it is an opening quote or bracket, the system increments the phrase level, e.g. from L1 to L2, and returns to block 606 for the next token.

If however, at block 612 a determination is made that the quote or bracket is not an opening quote or bracket, i.e. it is a close quote or bracket, the system decrements the phrase level, e.g. from L2 to L1, and returns to block 606 for the next token. Processing continues until all the tokens in the Token List are processed resulting in categorizing of the entire document by phrases, e.g. the beginning and ending of each level defines a phrase.

Figure 7:
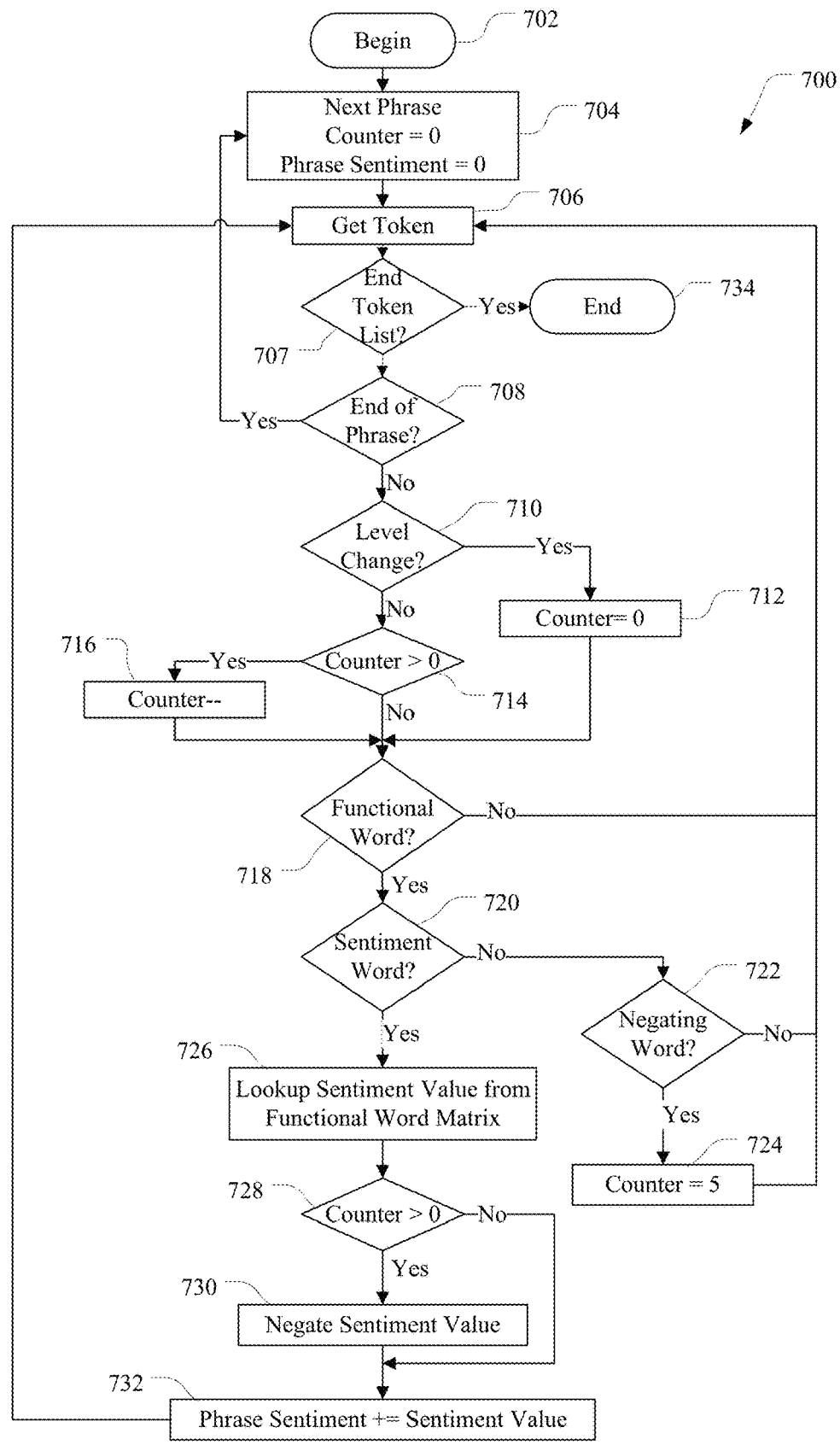
FIG. 7 is a flow diagram of the sentiment analysis process in accordance with one or more embodiments of the present invention.

Referring back to FIG. 4, the Token List with categorized phrase levels is forwarded to Sentiment Analysis module 700 for further processing. FIG. 7 is a flow diagram illustrating the Sentiment Analysis process 700 in accordance with one or more embodiments of the present invention. As illustrated, sentiment analysis begins at block 702. At block 704, the system retrieves the next phrase (i.e. the first phrase if it's the first time in this module), sets Counter to zero (0) and sets Phrase Sentiment to zero (0). At block 706, the system gets the next token from the Token List and proceeds to block 707 for a determination if it's the end of the Token List, i.e. no more tokens. If it is the end of the Token List, processing terminates at block 734. However, if a determination is made at block 707 that it is not the end of the Token List, processing continues to block 708 for a determination if the token is the end of the current phrase. If it is the end of the current phrase, processing returns to block 704 to begin analysis of a new phrase.

If however, at block 708, a determination is made that it is not the end of the current phrase, processing proceeds to block 710 for a determination is there is a phrase level change, e.g. L1 to L2. If it is phrase level change, the Counter is reset to zero at block 712 and processing continues to block 718. If however, at block 710, a determination is made that it is not a phrase level change, processing continues to block 714 for a determination if the Counter is greater than zero. If the counter is not greater than zero, processing continues to block 718. However, if at block 714, a determination is made that the Counter is greater than zero, the Counter is decremented by 1 in block 716 and processing continues to block 718.

At block 718, a determination is made if the token is a functional word. This determination may be made, for instance, by checking the token against words in the Functional Words matrix 302. If the token is not a functional word, processing returns to block 706 for the next token. In one or more embodiments, examples of functional words may include but not limited to the following "confident", "reliable", "doubtful", "uncertain", etc. Those of skill in the art appreciate that the list of functional words may be exhaustive and are not limited to those listed herein.

If however, a determination is made at block 718 that the token is a functional word, processing proceeds to block 720 for a determination if the token is a Sentiment Word. In one or more embodiments, examples of sentiment words include joyous, fortunate, delightful, elated, jubilant, etc. Negative sentiment words may include but not limited to the following: "slimy", "suffered", "turmoil", etc. Those of skill in the art appreciate that the list of sentiment words may be exhaustive and are not limited to those listed herein.

If the token is not a sentiment word, processing proceeds to block 722 for a determination if the token is a negating word. Examples of negating words are "not", "didn't", "isn't", etc. If the token is not a negating word, processing returns to block 706 for the next token. However, if at block 722, the token is a negating word, then the Counter is set to a value greater than zero, e.g. preferably 5, and processing returns to block 706 for the next token.

If however, a determination is made at block 720 that the token is a sentiment word, then the system proceeds to block 726 where a look up of the current sentiment value from the Functional Words matrix 302 is performed. From block 726, processing continues to block 728 for a determination if Counter is greater than zero. If Counter is not greater than zero, processing continues to block 732. If however, at block 728, the determination is that Counter is greater than zero, then the sentiment value is negated, i.e. set to negative of its current value, at block 730 and processing proceeds to block 732.

At block 732, the sentiment value is added to the Phase Sentiment and processing returns to block 704 for the next token. Processing of sentiment analysis module 700 continues until all the tokens in the Token List are processed. The sentiment values are sent to the Keywords meta data 312 for further processing.

Figure 8:
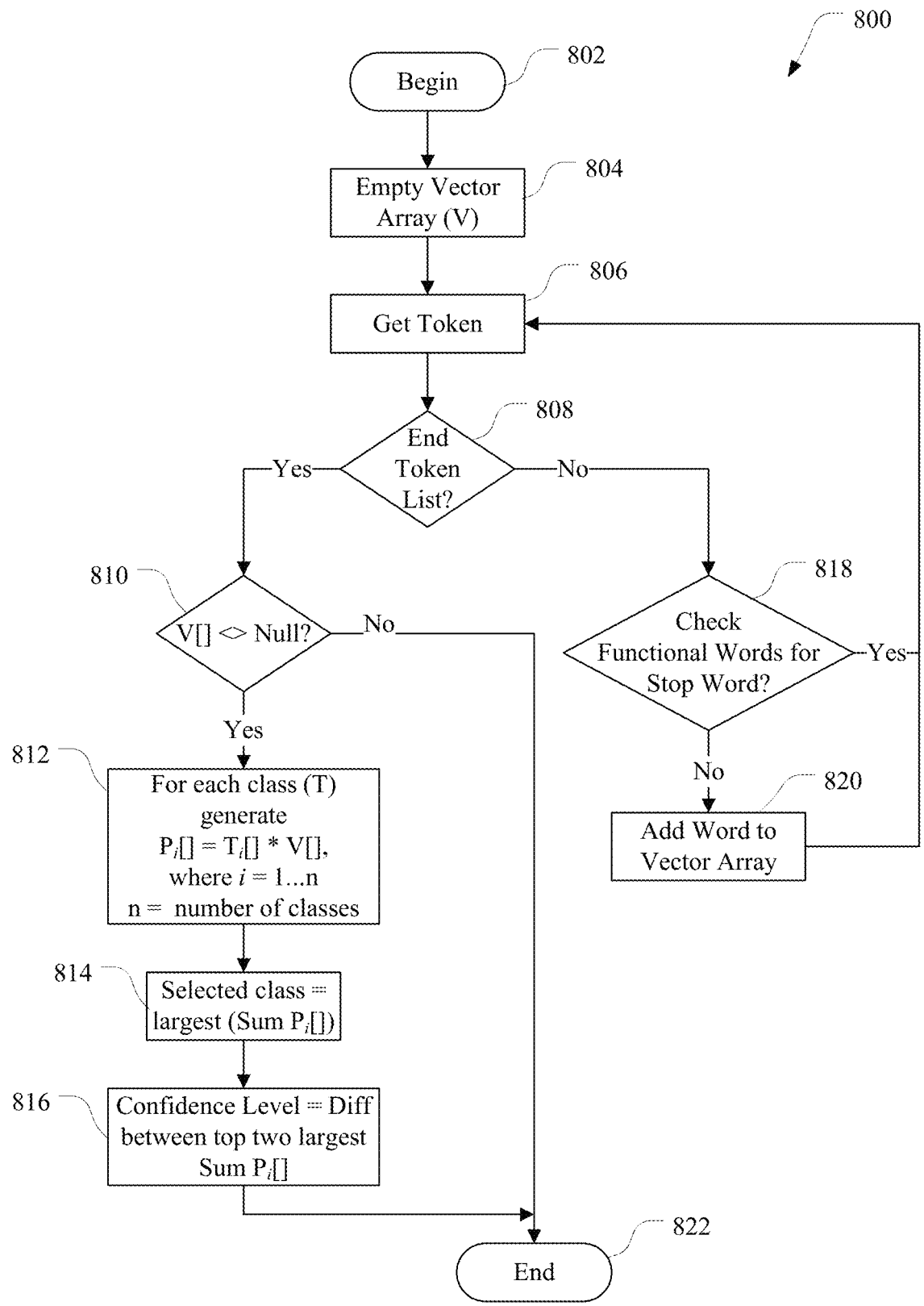
FIG. 8 is a flow diagram of the machine learning classifier process in accordance with one or more embodiments of the present invention.

Referring back to FIG. 4, the Token List is forwarded to ML Classifier 800 for further processing. FIG. 8 is a flow diagram illustrating the ML Classifier process 800 in accordance with one or more embodiments of the present invention. In general the ML Classifier uses machine learning to classify each document into document classes, e.g. Food, Technology, Sports, Business, Politics, etc. As illustrated, processing for ML 800 begins at block 802. At block 804 Vector Array, V[ ], is emptied. Processing continues to block 806 to fetch the next token from the Token List and continues to block 808, where a determination is made if it's the end of the Token List. If it's not the end of the Token List, processing proceeds to block 818 for a determination if the token is a Stop Word. This may be done by, for instance, checking the Functional Words matrix to determine if the token is a Stop Word. If it's determined that the token is a Stop Word, processing returns to block 806 for the next token. Examples of stop words include "and", "the", etc. However, if at block 818, a determination is made that the token is not a stop word, the token is added to the Vector Array (V[ ]) and processing returns to block 806 for the next token.

If however, at block 808, a determination is made that it is the end of the Token List, processing proceeds to block 810. At block 810 a determination is made if the Vector Array, V, is null. If Vector Array V[ ] is null, processing terminates to block 822.

If however, at block 810, Vector Array V[ ] is determined not to be null, processing proceeds to block 812. At block 812, the probability array, $P_i[\ ]$, is generated for each class using the equation:

$$P_i[\ ]=T_i[\ ]*V[\ ]$$

Where i is the class index with values from 1 to n classes, and T[ ] is matrix of weights assigned to different categories of items in each class. For instance, a T[ ] for a Food class may be a matrix comprising [sake 0.1, apple 0.01, etc.].

Processing continues to block 814 where the P[ ] values are summed for each class and the class with the highest sum of P[ ] is selected as the document classification. Processing continues to block 816 where the confidence level in the selection is determined. The confidence level is the difference between the two largest sums of P[ ]. Processing terminates at block 822 with the document classified and the document classification is sent to the Keywords meta data 312 for further processing.

Returning back to FIG. 3, in one or more embodiments, each keyword from NLP 400 processing (e.g. identified words list) in the Keywords meta data 312 is checked for tag as a System Keyword, e.g. at block 320. If the keyword is tagged as a System Keyword (see block 514 of FIG. 5), it is placed in the System Keywords library 308. However, if the keyword is not tagged as a System Keyword, it is processed through the Plasticity module 900 (see FIG. 9) for possible promotion to System Keyword status, i.e. to block 308. In block 322, links between System Keywords are generated; and in block 324, statistical data (e.g. volume, velocity, etc.) for each System Keyword is generated.

Figure 9:
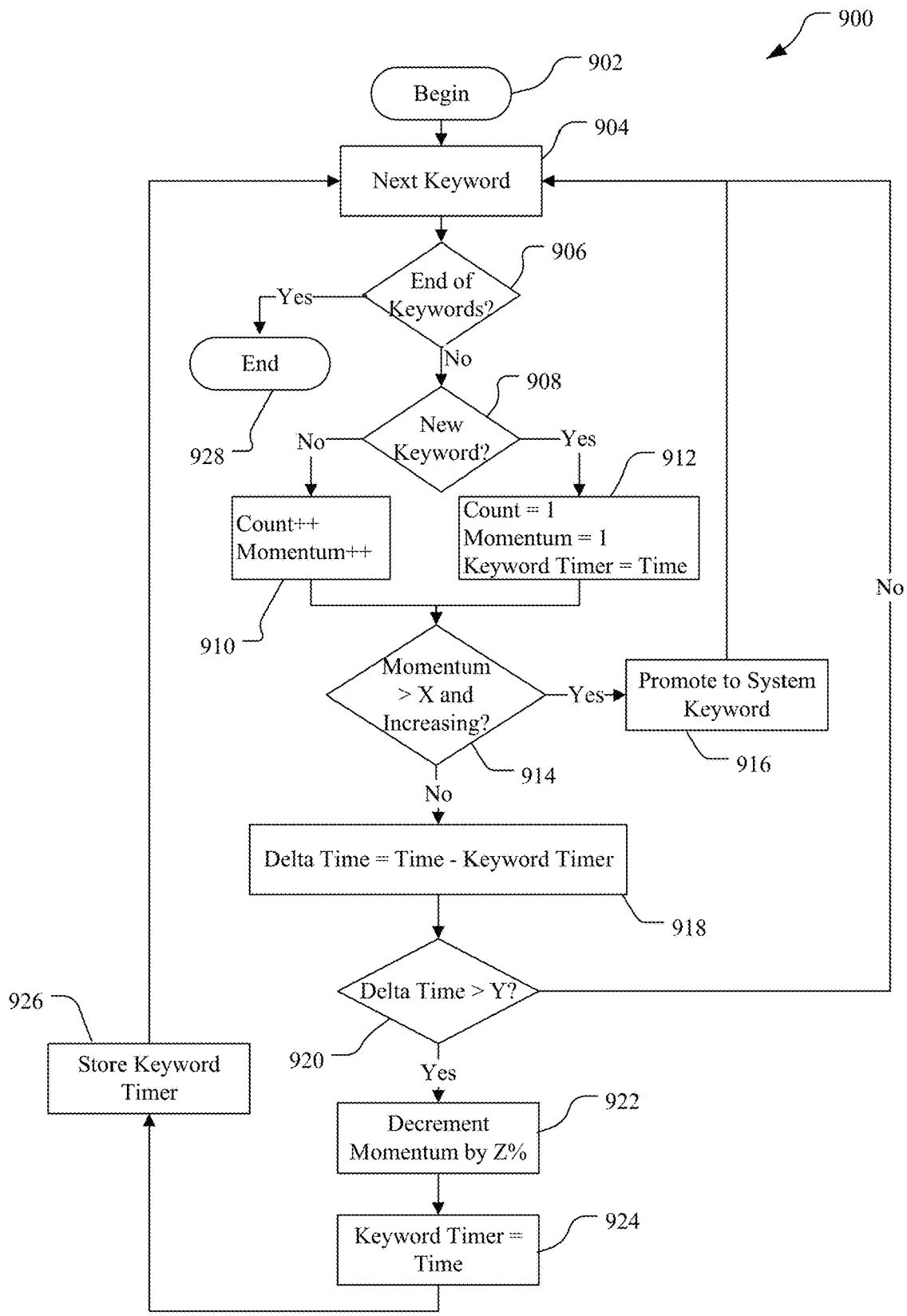
FIG. 9 is a flow diagram of the Keyword plasticity process in accordance with one or more embodiments of the present invention.

FIG. 9 is a flow diagram of the Keyword plasticity process 900 in accordance with one or more embodiments of the present invention. As illustrated, plasticity process 900 begins at block 902. At block 904, the system obtains the next non-System Keyword from Keywords meta data 312 and proceeds to block 906. At block 906, a determination is made if it's the end of the Keywords in the Keywords meta data matrix 312. If it is the end, e.g. all Keywords in the matrix have been processed, processing terminates at block 928.

However, if at block 906, the determination is that it's not the end of the Keywords in the Keywords meta data matrix 312, processing continues to block 908 for a determination if the Keyword is a new Keyword, i.e. Keyword not currently being processed by the plasticity module 900. If it is determined to be a new Keyword, variable Count is set to 1, variable Momentum is set to 1, and variable Keyword Timer is set to the current time. Processing then proceeds to block 914. However, if at block 908, it is determined that the Keyword is not new, variables Count and Momentum are incremented by 1. Processing then proceeds to block 914.

At block 914, a determination is made if Momentum is greater than a predetermined value, X, and increasing, i.e. has a positive velocity, then the Keyword is promoted from Keywords meta data matrix 312 to System Keywords library 308. However, if the determination at block 914 is false, then the elapsed time, i.e. Delta Time, is computed at block 918. The Delta Time is the difference between the current time and the Keyword Timer value. If the Delta Time is not greater than a predetermined value Y, e.g. 1.0 hours, then processing returns to block 904 for the next Keyword.

However, if at block 920, it is determined that the elapsed time (i.e. Delta Time) is greater than Y, processing proceeds to block 922 where Momentum is decremented by Z %. At block 924, Keyword Timer is set to current time and at block 926, the Keyword Timer is stored. Processing then returns to block 904 for processing of the next Keyword. Plasticity processing 900 continues so long as there is a Keyword in the Keywords meta data matrix 312.

Returning back to FIG. 2, outputs of percolator 300 are stored in Relationship Data repository 210. Data in Relationship Data repository 210 may include System Keywords, Keyword Links, Keyword stats, Keyword metadata, document sentiments, Keyword sentiments, document countries, etc. Relationship Data repository 210 may be a dedicated storage unit, a database server, disk array server, an indexed database, or any type of non-transitory computer readable memory in a computer system.

In one or more embodiments of the present invention, data in Relationship Data repository 210, e.g. Keywords, are processed and maintained by Keyword Cache System 1000.

In one or more embodiments, Keyword Cache System 1000 manages and processes the cache of System Keywords in Relationship Data repository 210 for presentation. The Keyword Cache System 1000 is accessible via user interface 214.

Figure 10:
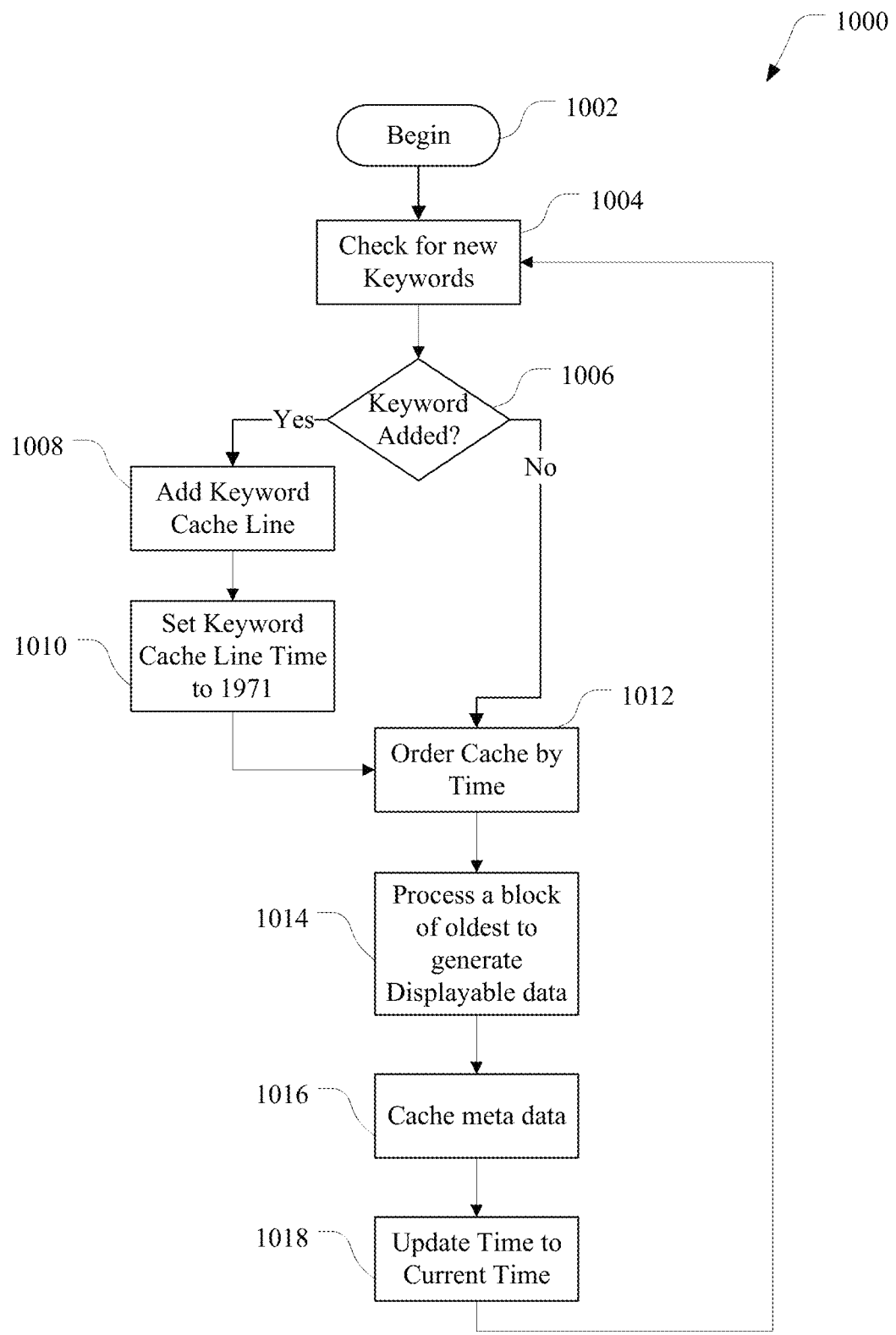
FIG. 10 is a flow diagram illustrating the Keyword cache system in accordance with one or more embodiments of the present invention.

FIG. 10 is a flow diagram illustrating the Keyword cache system 1000 in accordance with one or more embodiments of the present invention. As illustrated, Keyword Cache system 1000 begins at block 1002. At block 1004, the system checks Relationship Data repository 210 for new System Keywords. At block 1006, a determination is made if a new System Keyword has been added to the repository. If no, processing proceeds to block 1012. However, if a new System Keyword has been added, processing proceeds to block 1008 to add the new Keyword Cache Line to the system cache. At block 1010, the new Keyword Cache Line is set to a base time, e.g. Unix Epoch Time of 1971. Processing proceeds to block 1012.

At block 1012, the system cache is ordered by time. Processing continues to block 1014 where a number, e.g. 10, of the oldest Cache Lines are processed to generate displayable data. Processing continues to block 1016 where the meta data for the processed System Keywords are updated in Cache. Processing continues to block 1018 where the Keyword Cache Lines for the processed System Keywords are set to current time. The Keyword cache system 1000 process is a continuous process to keep cache fresh for access through User Interface 214. In one or more embodiments, recently viewed System Keywords in cache may be kept fresh by a process that places these System Keywords at the top of the cache list. For instance, if the Keyword Cache System receives a request from User Interface 214 for a System Keyword in cache, the cache system updates the Cache Line for the requested System Keyword to the base time, i.e. Unix Epoch Time of 1971, and subsequently sends the data to fulfil the request. Updating the Cache Line time to the Epoch time assures that the statistical data for the requested System Keyword is up to date because the cache system is forced to process the requested System Keyword in the current cycle.

User Interface 214 may provide access to System Keywords and related statistics in relationship data repository 210 through search interfaces, drop-down interfaces of recent trending keywords, etc.

Figure 11:
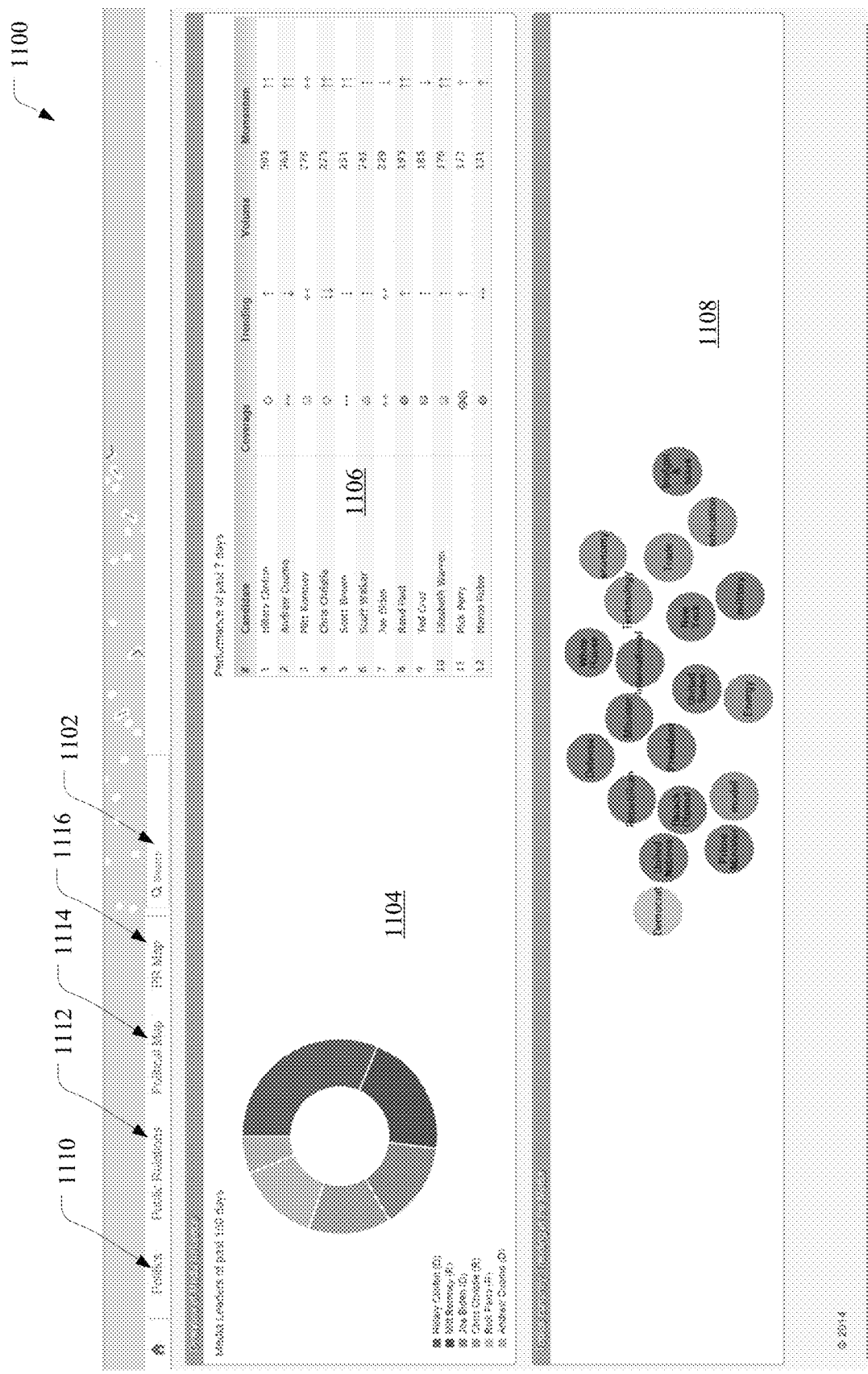
FIG. 11 is an illustration of an exemplary home screen of the User Interface in accordance with one or more embodiments of the present invention.

FIG. 11 is an illustration of an exemplary home screen 1100 of the User Interface 214 in accordance with one or more embodiments of the present invention. As illustrated, the user interface display home screen 1100 may comprise Search box 1102; graphical display box 1104 showing media leaders during a set period of time, e.g. past 180 days; tabular box 1106 showing recent performance of a System Keyword in a fixed period of time, e.g. past 7 days; and box 1108 which uses symbols to show currently trending topics. The user interface screen 1100 may further comprise one or more tabs such as "Politics" 1110; "Public Relations" 1112; "Political Map" 1114; and "PR Map" 1116.

In trending topics box 1108, each trending topic may be represented with a pie and one or more colors (e.g. color codes) may be used to differentiate the pies, e.g. what's hot and what's not hot. For instance, green may be used to show a positive sentiment while red is used for a negative sentiment. Also, several shades of each color may be used for different levels of sentiment. For instance, light green may be used for "slightly positive"; green for "positive"; and dark green for "very positive." Also, light red may be used for "slightly negative"; red for "negative"; and dark red for "very negative." Those of skill in the art would appreciate that the configuration, look and feel of the user interface could vary from that described herein without deviating from the spirit of the invention.

Figure 12:
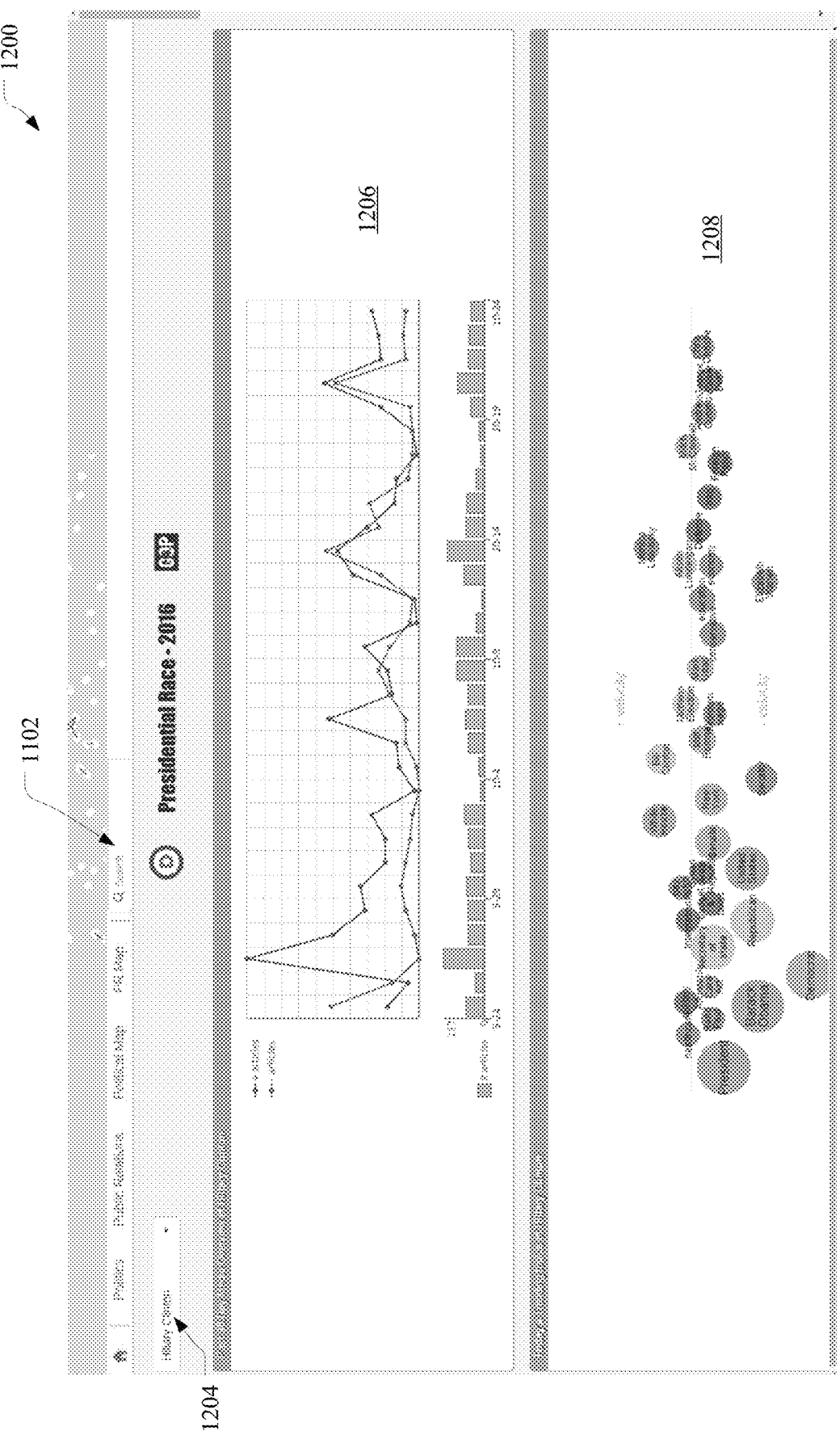
FIG. 12 is an illustration of an exemplary Politics screen of the User Interface in accordance with one or more embodiments of the present invention.

FIG. 12 is an illustration of an exemplary Politics screen of the User Interface 214 when the "Politics" 1110 tab is selected. As illustrated, politics screen 1200 may display the currently trending political topic, e.g. "Presidential Race—2016" in title box 1202; provide a drop-down menu for different System Keywords in block 1204 from which the user may choose a Selected Keyword, e.g. "Hillary Clinton"; provide a graphical display of the media overview for the Selected Keyword for a selected period of time, e.g. past 30 days, in block 1206; and the current trending topics for the Selected Keyword in box 1208.

And as discussed above with respect to trending topics box 1108, in trending topics (or keywords) box 1208, each trending topic may be represented with a pie and one or more colors (e.g. color codes) may be used to differentiate the pies, e.g. what's hot and what's not hot. For instance, green may be used to show a positive sentiment while red is used for a negative sentiment. Also, several shades of each color may be used for different levels of sentiment. For instance, light green may be used for "slightly positive"; green for "positive"; and dark green for "very positive." Also, light red may be used for "slightly negative"; red for "negative"; and dark red for "very negative." Also, the size of each pie may depend on the number of mentions (i.e. volume) of the topic in relation to the Selected Keyword for a certain period, e.g. number of mentions per day. In addition, the location of the pie in the vertical direction may depend on the rate of change of volume (i.e. velocity) of the topic (or Selected Keyword), e.g. negative velocities in the lower half of the chart and positive velocities in the upper half of the chart.

Figure 13:
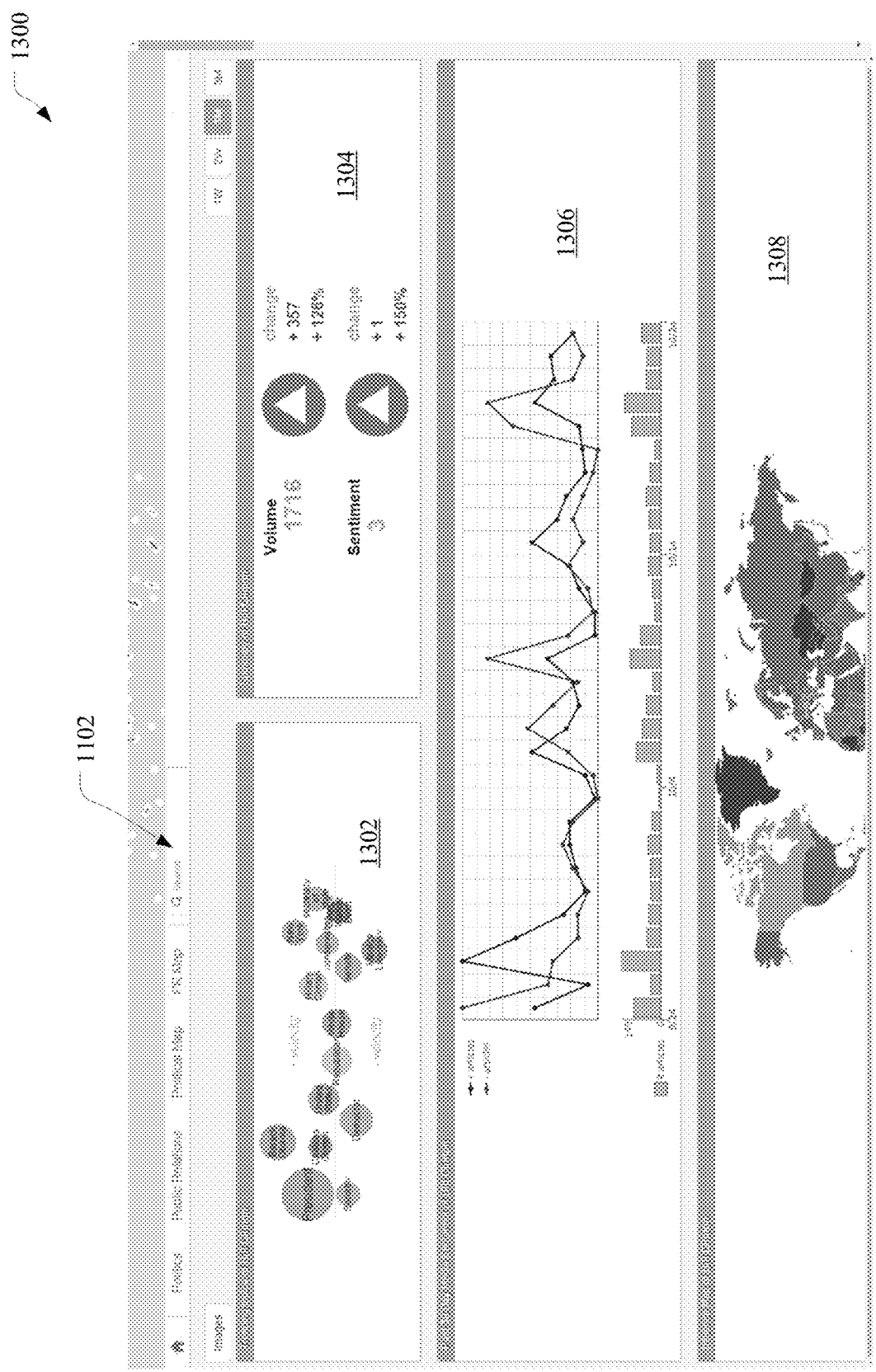
FIG. 13 is an illustration of an exemplary Keyword display screen of the User Interface in accordance with one or more embodiments of the present invention.

FIG. 13 is an illustration of an exemplary Keyword display screen of the User Interface 214 when a keyword, i.e. Selected Keyword, is entered in the search box 1102. As illustrated, the keyword display screen 1300 comprises the current trending topics for the Selected Keyword in block 1302; summary of statistics for the Selected Keyword in block 1304; provide a graphical display of the media sentiment for the Selected Keyword for a selected period of time, e.g. past 30 days, in block 1306; and an influence map for the Selected Keyword in block 1308. The influence map could be map of the world using the color codes as discussed above to show sentiment levels for the Selected Keyword in different regions of the world.

While the invention herein disclosed has been described by means of specific embodiments and applications thereof, numerous modifications and variations could be made thereto by those skilled in the art without departing from the scope of the invention set forth in the claims.

What is claimed is:

1. A method for determining crowd sentiment comprising:
   scraping a computer network to obtain one or more documents;
   storing new documents of said one or more documents in a document repository;
   processing said new documents of said one or more documents in said document repository through a filter to extract one or more system keywords, wherein said filter generates keyword links and statistical information for each of said one or more system keywords for a predetermined period of time, wherein said statistical information for said each of said one or more system keywords comprises volume and crowd sentiment, wherein volume is number of occurrences of a system keyword for each period;
   maintaining said one or more system keywords, said statistical information and said keyword links with a keyword cache system for access by a user; and
   repeating the above steps at regular occurring sample intervals.

2. The method of claim 1, wherein said keyword links comprise links between any two of said one or more system keywords, and links between said one or more system keywords and documents in said document repository.

3. The method of claim 1, wherein said statistical information is updated by said keyword cache system upon request for a system keyword by said user.

4. The method of claim 1, wherein said filter comprises a natural language processing module and a plasticity module.

5. The method of claim 4, wherein said natural language processing module extracts at least one keyword from said new documents and tags each of said at least one keyword that is a system keyword.

6. The method of claim 5, wherein said plasticity module determines when one or more of said at least one keyword that is not tagged as a system keyword is promoted to system keyword status based on momentum, wherein momentum is the number of occurrences of the untagged keyword per unit time.

7. The method of claim 4, wherein said natural language processing module further determines a classification for each of said one or more documents using a machine learning algorithm.

8. A system for determining crowd sentiment comprising:
   a scraper computer communicatively coupled to a computer network, wherein said scraper obtains one or more documents published over said computer network at regular occurring sample intervals;
   a document repository coupled to said scraper for storing new documents of said one or more documents;
   a filter system implemented in a computer and coupled to said document repository for processing said new documents, wherein said filter extracts one or more system keywords from said one or more documents, wherein said filter generates keyword links and statistical information for each of said one or more system keywords in a predetermined period of time, wherein said statistical information for said each of said one or more system keywords comprises volume and crowd sentiment, wherein volume is number of occurrences of a system keyword in each period;
   a relationship data repository coupled to said filter for storing said one or more system keywords and said keyword links and said statistical information;
   a keyword cache system for maintaining said one or more system keywords, said statistical information and said keyword links; and
   a user interface coupled to said keyword cache system and said document repository.

9. The system of claim 8, wherein said keyword links comprise links between any two of said one or more system keywords and links between said one or more system keywords and said documents in said document repository.

10. The system of claim 8, wherein said statistical information is updated by said keyword cache system upon a search request for a system keyword via said user interface.

11. The system of claim 8, wherein said filter comprises a natural language processing module and a plasticity module.

12. The system of claim 11, wherein said natural language processing module extracts at least one keyword from said new documents and tags each of said at least one keyword that is a system keyword.

13. The system of claim 12, wherein said plasticity module determines when one or more of said at least one keyword that is not tagged as a system keyword is promoted to system keyword status based on momentum, wherein momentum is the number of occurrences of the untagged keyword per unit time.

14. The system of claim 11, wherein said natural language processing module further determines a classification for each of said new documents using a machine learning algorithm.

15. A computer program product for determining crowd sentiment, the computer program product comprising non-transitory computer-readable media encoded with instructions for execution by a processor to perform a method comprising:

scraping a computer network to obtain one or more documents;

storing new documents of said one or more documents in a document repository;

processing each of said new documents through a filter to extract at least one keyword;

identifying each of said at least one keyword that is a system keyword and updating a relationship database comprising one or more system keywords, keyword links and statistical information for each of said one or more system keywords for a predetermined period of time, wherein said statistical information for said each of said one or more system keywords comprises volume and crowd sentiment, wherein volume is number of occurrences of a system keyword in each sample and wherein velocity is rate of change of volume;

maintaining said one or more system keywords, said statistical information and said keyword links with a keyword cache system; and repeating the above steps at regular occurring sample intervals.

16. The computer program product of claim 15, wherein said keyword links comprise links between any two of said one or more system keywords and links between said one or more system keywords and said documents in said document repository.

17. The computer program product of claim 15, wherein said statistical information is updated by said keyword cache system upon a user request for a system keyword.

18. The computer program product of claim 15, wherein said filter comprises a natural language processing module and a plasticity module.

19. The computer program product of claim 18, wherein said natural language processing module extracts said at least one keyword from said new documents and tags each of said at least one keyword that is a system keyword.

20. The computer program product of claim 19, wherein said plasticity module determines when one or more of said at least one keyword that is not tagged as a system keyword is promoted to system keyword status based on momentum, wherein momentum is the number of occurrences of the untagged keyword per unit time.

* * * * *